US011100077B2

(12) United States Patent
Chkodrov et al.

(10) Patent No.: US 11,100,077 B2
(45) Date of Patent: Aug. 24, 2021

(54) EVENT TABLE MANAGEMENT USING TYPE-DEPENDENT PORTIONS

(71) Applicant: Microsoft Technology Licensing, LLC, Redmond, WA (US)

(72) Inventors: Georgi Chkodrov, Redmond, WA (US); Russell Biles, Bellevue, WA (US); Vidhi Agarwal, Bellevue, WA (US); Anjani Kumar Lavania, Duvall, WA (US); Jeffrey Scott Shaw, Monroe, WA (US); Jose Wilson Morris, Bothell, WA (US); Jonathan Peary Morris, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 411 days.

(21) Appl. No.: 15/891,222

(22) Filed: Feb. 7, 2018

(65) Prior Publication Data
US 2019/0243913 A1   Aug. 8, 2019

(51) Int. Cl.
*G06F 16/22* (2019.01)
*G06F 16/2455* (2019.01)
*G06F 16/25* (2019.01)

(52) U.S. Cl.
CPC ...... *G06F 16/2282* (2019.01); *G06F 16/2291* (2019.01); *G06F 16/2455* (2019.01); *G06F 16/254* (2019.01)

(58) Field of Classification Search
CPC ............. G06F 16/2282; G06F 16/2291; G06F 16/254; G06F 16/2455
See application file for complete search history.

(56) References Cited

U.S. PATENT DOCUMENTS

| | | | | |
|---|---|---|---|---|
| 6,161,103 A | * | 12/2000 | Rauer | G06Q 30/02 |
| 6,189,004 B1 | * | 2/2001 | Rassen | G06F 16/2423 |
| 2003/0028509 A1 | * | 2/2003 | Sah | G06F 16/284 |
| 2004/0199517 A1 | * | 10/2004 | Casati | G06F 16/283 |

(Continued)

OTHER PUBLICATIONS

Bonifati et al. "Designing data marts for data warehouses", ACM Transactions on Software Engineering and Methodology (Year: 2001).*

(Continued)

*Primary Examiner* — Mark D Featherstone
*Assistant Examiner* — Kweku William Halm
(74) *Attorney, Agent, or Firm* — Workman Nydegger

(57) ABSTRACT

The storage of events of multiple types in a queriable table. The queriable table has at least one common column that corresponds to a field that is common across events regardless of event type. The queriable table also has at least one field-varying column that corresponds to a type-dependent field that depends on event type. The queriable table is populated using multiple events. For instance, the event could be at least some log events that are received from multiple computing systems. The population occurs by assigning each event to a row of the queriable table. The common column is populated with values taken the same common field across event types. On the other hand, the field-varying column is populated with values of different fields from those events depending on the event type.

14 Claims, 7 Drawing Sheets

(56) References Cited

U.S. PATENT DOCUMENTS

| | | | |
|---|---|---|---|
| 2006/0075330 A1* | 4/2006 | Guido | H04L 67/02 |
| | | | 715/226 |
| 2006/0112175 A1* | 5/2006 | Sellers | H04L 41/5074 |
| | | | 709/223 |
| 2016/0330246 A1 | 11/2016 | Narayanaswamy et al. | |
| 2020/0065303 A1* | 2/2020 | Bhattacharjee | G06F 16/278 |

OTHER PUBLICATIONS

Cochrane et al., "Integrating Trigges and Declarative Cosntraints in SQL Database Systems" p. 1-12 (Year: 2008).*

Liao et al., "Using document level cross-event inference to improve event extraction", p. 1-9 (Year: 2010).*

"Real-Time Big Data Security", Retrieved from http://metron.apache.org, Retrieved on: Jan. 4, 2017, 2 Pages.

"International Search Report and Written Opinion Issued in PCT Application No. PCT/US2019/016204", dated Mar. 28, 2019, 11 Pages. (MS# 403603-WO-PCT).

Przemyslaw, et al., "Detecting Security Violations Based on Multilayered Event Log Processing", In Journal of Telecommunications and Information Technology, Oct. 1, 2015, pp. 30-36.

Zhen, et al., "JSON Data Management : Supporting Schema-less Development in RDBMS", In Proceedings of the 2014 International Conference on Management of Data, Jun. 22, 2014, pp. 1247-1258.

Zhen, et al., "Management of Flexible Schema Data in RDBMSs— Opportunities and Limitations for NoSQL", In Proceedings of Management of Flexible Schema Data in RDBMSs—Opportunities and Limitations for NoSQL, Jan. 4, 2015, 9 Pages.

* cited by examiner

EVENT TABLE MANAGEMENT USING TYPE-DEPENDENT PORTIONS

BACKGROUND

Computing systems and associated networks have greatly revolutionized our world. Conventional computing systems engage in countless detailed operations in order to perform their larger function. An operating system or application running on the computing systems will often generate events. These events are gathered in a local log, which may then be reviewed to understand the historical operation of that computing system.

Recently, in order to understand the historical operation of large groups of computing systems, the local logs of each of those computing systems are mined by transmitting a filtered portion of those local logs to a centralized log. That centralized log may then be reviewed to understand the historical operation of the larger set of computing systems. Such centralized logs are helpful when diagnosing whether there is a large scale security attack or computer virus outbreak occurring over a large collection of computing systems and/or whether there are operational problems within the larger network. The centralized logs are also helpful as once events are gathered in the centralized logs, the event is not lost by compromise of a local log.

Conventionally, the centralized log is composed of a sparse table in which each row represents an event. When an event arrives, the fields of the event are evaluated. If a column already exists for that field, the value is simply placed into that column. If a column does not yet exist for that field, a column is created to accommodate the value for that field. When the log collects events for a large variety of event types, there may be a large number of columns in such a table. But since any given event may only have values for a small percentage of the available columns, the table tends to be sparsely populated. This sparse-table method is quite nice as the model for issuing queries is simple, and would typically involve simple filter operations, which are easy for users to understand. Thus, this method is considered very user friendly.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the storage of events of multiple types in a queriable table. The queriable table has at least one common column that corresponds to a particular field that is common across events regardless of event type. The queriable table also has at least one field-varying column that corresponds to a type-dependent field that depends on event type. The queriable table is populated using multiple events. For instance, the multiple events in the table could be at least some log events that are received from multiple computing systems. The population occurs by assigning each event to a row of the queriable table. The common column is populated with values taken from the same common field across event types. On the other hand, the field-varying column is populated with values of different fields from those events depending on the event type.

In at least in some embodiments, when querying against that queriable table, the query may be taken in essentially two stages, whether in response to a single query, or in response to separate queries. First, the query may apply filtering operations on the common column to return a filtered set of rows of the queriable table. For instance, perhaps rows of a common event type are returned. Then, the filtered set of rows may be operated upon against a value parameter of the type-dependent field in the field-varying column. For instance, that type-dependent field may be parsed from the field-varying column.

Here, there are fewer columns than in the sparse table method, and the table is more densely populated, if not completely populated. The query process is slightly more complicated than it would be with a sparse table approach, but much simpler than it would be if a relational database were employed with one table per event type. There would be no need for the user to remember the table or the unique field types of the tables, and no or few union operations would be necessary. Yet, the query process is still powerful allowing for detailed querying perhaps in two stages upon all of the fields of various different types of events.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
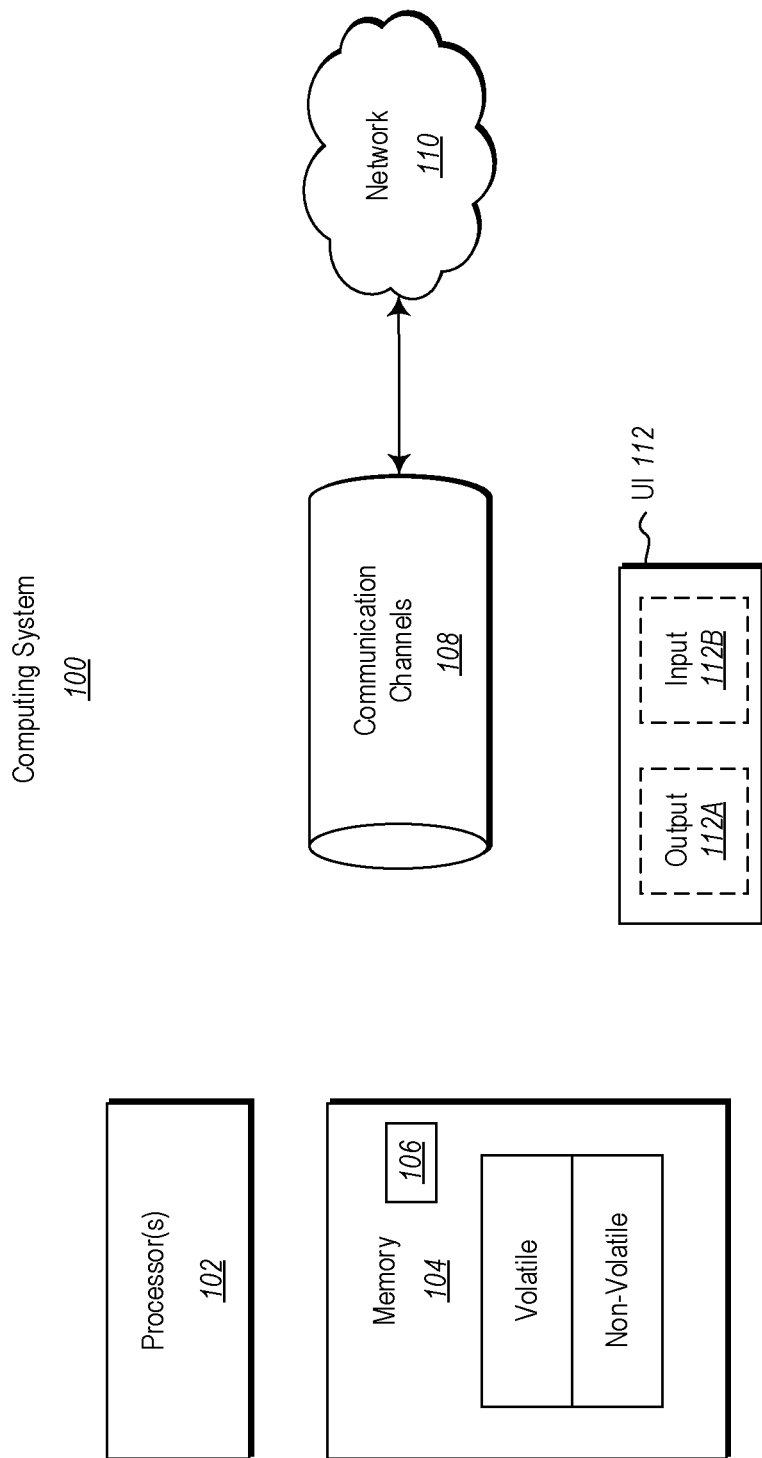
FIG. 1 illustrates an example computer system in which the principles described herein may be employed.

At least some embodiments described herein relate to the storage of events of multiple types in a queriable table. The queriable table has at least one common column that corresponds to a particular field that is common across events regardless of event type. The queriable table also has at least one field-varying column that corresponds to a type-dependent field that depends on event type. The queriable table is populated using multiple events. For instance, the multiple events in the table could be at least some log events that are received from multiple computing systems. The population occurs by assigning each event to a row of the queriable table. The common column is populated with values taken from the same common field across event types. On the other hand, the field-varying column is populated with values of different fields from those events depending on the event type.

In at least some embodiments, when querying against that queriable table, the query may be taken in essentially two stages, whether in response to a single query, or in response to separate queries. First, the query may apply filtering operations on the common column to return a filtered set of rows of the queriable table. For instance, perhaps rows of a common event type are returned. Then, the filtered set of rows may be operated upon against a value parameter of the type-dependent field in the field-varying column. For instance, that type-dependent field may be parsed from the field-varying column.

Here, there are fewer columns than in the sparse table method, and the table is more densely populated, if not completely populated. The query process is slightly more complicated than it would be with a sparse table approach, but much simpler than it would be if a relational database were employed with one table per event type. There would be no need for the user to remember the table or the unique field types of the tables, and no or few union operations would be necessary. Yet, the query process is still powerful allowing for detailed querying perhaps in two stages upon all of the fields of various different types of events.

Because the principles described herein operate in the context of a computing system, a computing system will be described with respect to FIG. 1. Then, concept of a queriable table that includes both one or more common columns, and one or more field-varying columns will be described with respect to FIGS. 2 through 5. The population of that queriable table will then be described with respect to FIG. 6. The querying of that queriable table will then be described with respect to FIG. 7.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media include RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
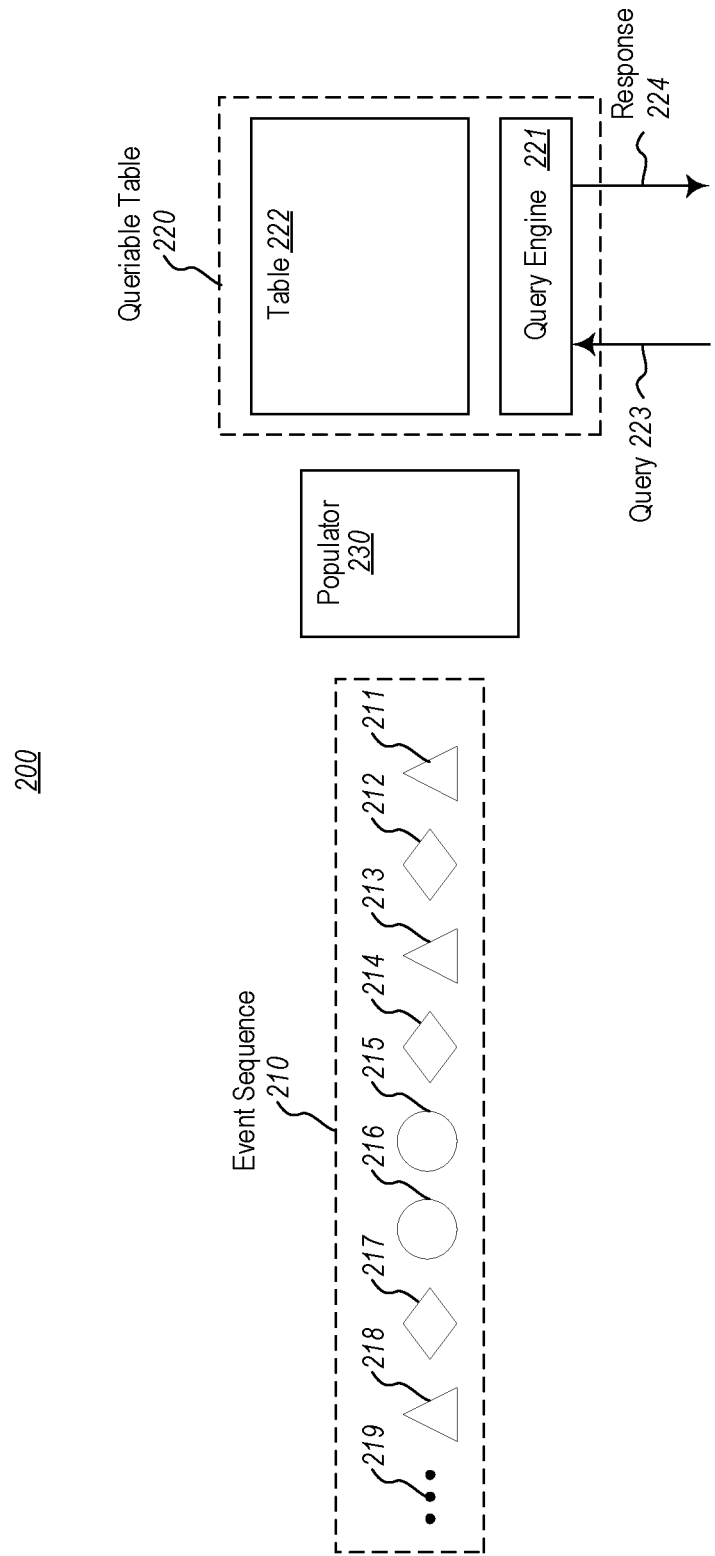
FIG. 2 illustrates an environment in which the principles described herein may be employed, in which there is an event sequence that is to be used to populate a queriable table.

FIG. 2 illustrates an environment 200 in which the principles described herein may be employed. In the environment, there is an event sequence 210 that is to be used to populate a queriable table 220. In this description and in the claims, the term "event" is used to refer to a record of an occurrence. The queriable table 220 includes a table 222 and a corresponding query engine 221 that may be used to receive and process queries (such as query 223) against the table 222, and return responses (such as response 224) to those queries.

In this description and in the claims, a "table" is defined as any collection of information that is organized in accordance with two or more dimensions, where one dimension (which we will call herein a "column") corresponds to a field, and another dimension (which we will call herein a "row") corresponds to the particular event. The intersection of the two dimensions may include a value of a field corresponding to the intersection position in the first dimension (or column) for the event corresponding to intersection position in the second dimension (or row). Thus, the terms "table", "column" and "row" are to be interpreted very broadly herein.

The query engine 221 may operate as a computer program within a computing system, such as the computing system 100 of FIG. 1. Likewise, the table 222 may be stored by a computing system, such as the computing system 100 of FIG. 1. A table populator 230 may be used to populate events, such as from the event sequence 210, into the table 222. The table populator 230 may be a component that is implemented on a computing system, such as the computing system 100 of FIG. 1. The computing system that implements the query engine 221, that stores the table 222, and that implements the query populator 230, may be the same computing system, or different computing systems, or in various combinations.

The event sequence 210 includes events of different event types. In the illustrated example, the event sequence 210 is illustrated as including eight events 211 through 218. However, the ellipses 219 represents that there may be many more events that are used to populated the queriable table 220. There may be thousands, millions, or enumerable numbers of events in the event sequence 210. That said, the principles described here are not limited to embodiments in which all events of the event sequence 210 are stored within the queriable table 220. Furthermore, the principles described herein are not limited to embodiments in which the queriable table 220 only stores events from the event sequence 210.

The event sequence 210 includes events of different event types. In FIG. 2, events of a common event type are symbolized by the visual representation of that event being of the same shape. For instance, events 211, 213 and 218 are of the same event type (e.g., a first event type) as they are each represented as a triangle. Events 212, 214 and 217 are of the same event type (e.g., a second event type) as they are each represented by a rhombus. Events 215 and 216 are of the same event type (e.g., a third event type) as they are each represented as a circle. The first, second, and third event types are different event types. Though the event sequence 210 is illustrated as including only three different event types in FIG. 2, the ellipses 219 again represents flexibility in the number of event types that are within an event sequence. There may be dozens, hundreds, or even thousands of event types within the event sequence 210. The ellipses 219 further represents that the principles described herein are not limited to any particular number of events of any given event type.

Figure 3:
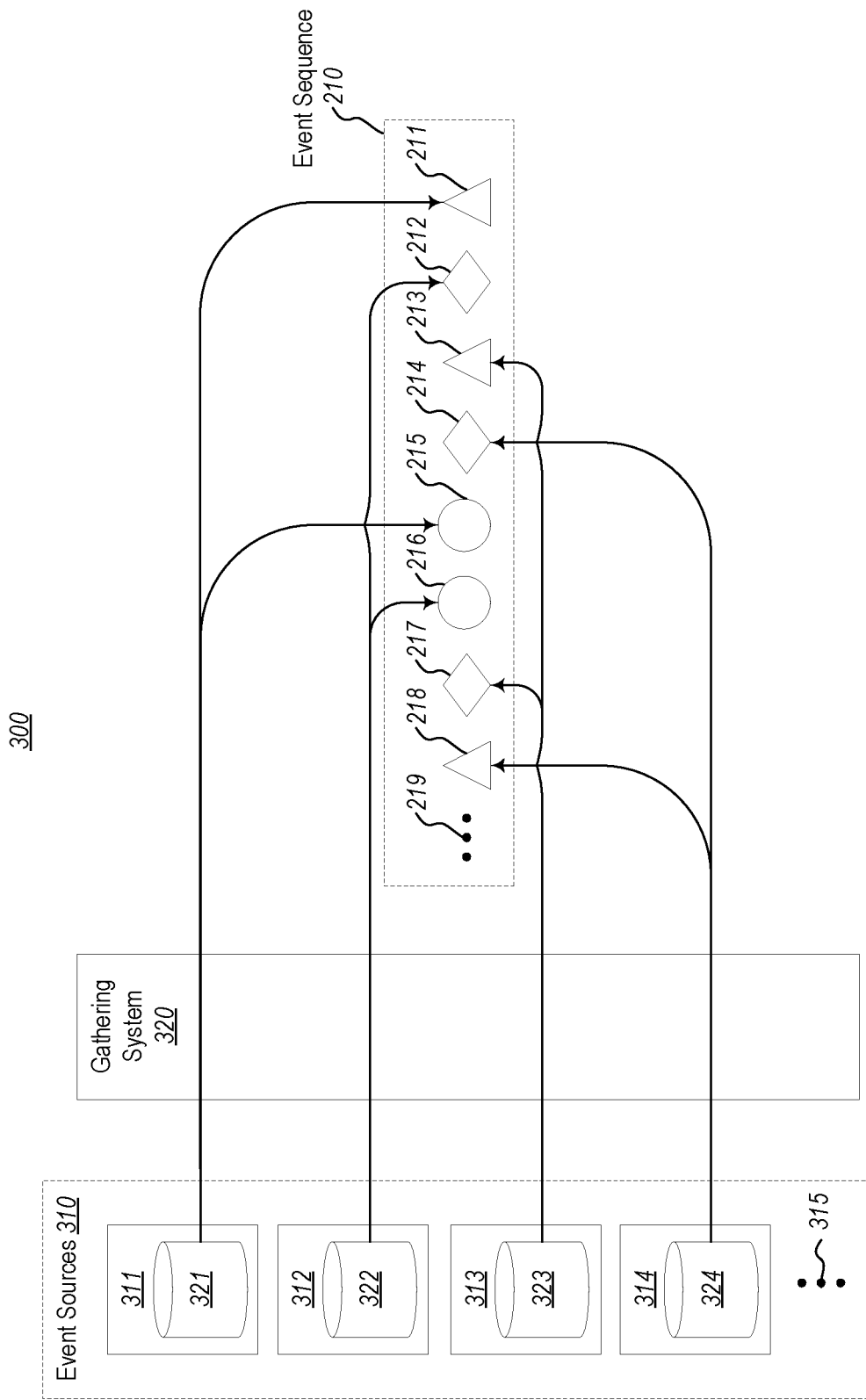
FIG. 3 illustrates an example environment in which the event sequence of FIG. 2 is composed of events provided by multiple event sources.

The event sequence 210 may be any event sequence, including a stored event sequence, or an event stream, or a combination. FIG. 3 illustrates an example environment 300 in which the event sequence 210 is composed of events provided by multiple event sources 310. For instance, in the illustrated example of FIG. 3, the event sources 310 includes four event sources 311, 312, 313 and 314. However, the ellipses 315 represent that there may be any number of event sources contributing to the event stream.

In one embodiment, each of the events sources 311 through 314 includes a respective local log 321 through 324. Each local log stores events that were received by that event source, or which were generated at the event source. A gathering system 320 operates to gather all or a subset of those locally stored events to thereby generate the event stream. The precise gathering system 320 is not critical to the broader aspects described herein. To ensure that the desired log events are properly uploaded, each node in the flow of the uploading process may bookmark the current position that it can confirm that the recipient has actually received. Examples of gathering systems include direct upload systems in which each of the event sources includes an uploading module that uploads events to the event stream; an intermediary upload system that includes multiple intermediaries, each responsible for receiving events from a subset of the event sources, and then provide the result in the form of part of the event stream; and a publish/subscribe system in which the events are published into a collection, and in which the populator subscribes to certain events within the collection.

In any case, regardless of the form of the gathering system 320, in the illustrated example, event source 311 contributes events 211 and 215 from its local log 321, event source 312 contributes events 212 and 216 from its local log 322, event source 313 contributes events 213 and 217 from its local log 323, and event source 314 contributes events 214 and 218 from its local log 324. The event sources 310 may each be computing systems, such as the computing system 100 described above with respect to FIG. 1. The gathering system 320 may likewise be a computing system, such as the computing system 100 described with respect to FIG. 1.

As an example, the environment 300 may be an environment in which the events are gathered for cyber defense purposes to detect current security problems within the network represented by the various event sources 310. Such security problems might include, for instance, a virus outbreak, a hacker attack, or the like. By querying against the queriable table 220, larger organizations can discover security problems, and provide remedial measure to mitigate, counteract, or eliminate the threat posed by the security problems. As another example, the environment 300 may be used to evaluate for operation problems. For instance, perhaps an evaluation may uncover that a service crash occurs if a given sequence of steps is performed.

Figure 4:
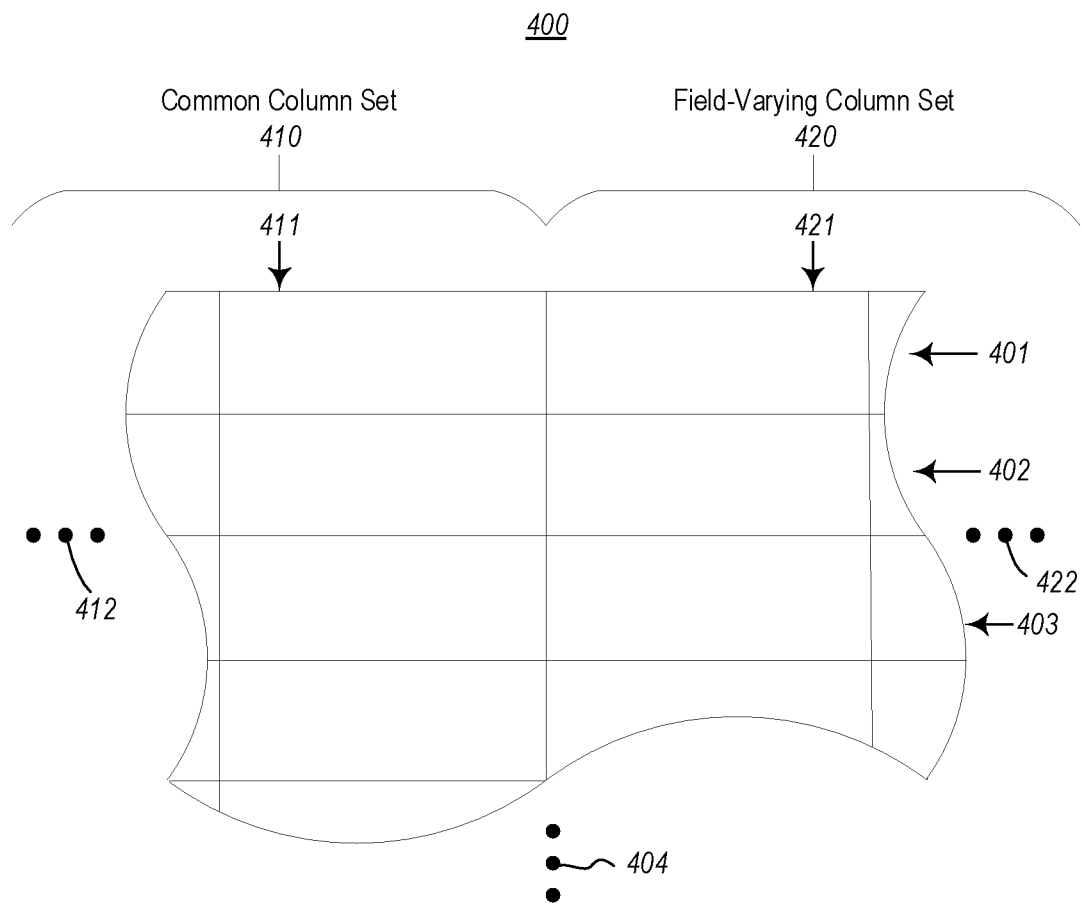
FIG. 4 is an general example of the table of FIG. 2.

FIG. 4 illustrates a table 400, which represents an example of the table 222 of FIG. 2. The table 400 includes multiple rows 401, 402 and 403, one row for storing each event. While only three rows are illustrated in the table 400 of FIG. 4, the ellipses 404 represent that there may be any number of rows within the table 400. If each event has an assigned row, and there are millions of events stored within the table 400, there may be millions of rows within the table 400.

The table 400 includes a common column set 410 that includes at least one common column 411 that corresponds to a common field that is the same regardless of event type. For instance, there are some fields that are present within all types of event types. Examples include a creation time field designating a time that the event occurred, an event type identifier field that uniquely identifies an event type of the event, an event source identifier that identifies a computing system on which the event occurred or was detected, and so forth. These are fields that are relevant regardless of the event type. Although only one common column 411 is shown amongst the common column set 410 in FIG. 4, the ellipses 412 represent that the common column set 410 may include any number of common columns. In one embodiment, to speed up querying, the common columns are indexed.

The table 400 also includes a field-varying column set 420 that includes at least one field-varying column 421 that corresponds to a type-dependent field that depends on event type. This column 421 stores one or more field values for fields that may differ depending on an event type. For instance, suppose that there is an event type for process creation. A field that is unique to that event type might be a process identifier. If the event type were an account creation event type, a field that is unique to that event might be a username. The type-dependent field need not be a field that is absolutely unique to a particular event type, but it is a field that is not common across all event types. For instance, a username field may be useful for an account creation event type, but may also be relevant for other event types, such as an authentication event type. Nevertheless, this is still a type-dependent field because not all event types will have that field.

The field-varying column may express each of the one or more type-dependent fields that are contained therein as a set of name-value pairs, one for each type-dependent field. Thus, a field-varying column may express a single type-dependent field as a single name-value pair, with the name representing the name of the type-dependent filed, and the value of course representing the value of that type-dependent field. If there are multiple type-dependent fields represented within a type-dependent field, there may a name-value pair for each of the multiple type-dependent fields.

As an example, the following represents in JSON the possible content of a field-varying column that is of a process creation event type:

```
{
    "SubjectUserName":"SN2ISWUTLA117$",
    "SubjectUserSid":"S-1-5-18",
    "SubjectLogonId":"0x3e7"
    "ProcessId":"0x15e8"
}
```

In this JSON example, the field-varying column includes four name-value pairs for four fields: 1) a SubjectUserName field, 2) a SubjectUserSId field, 3) a SubjectLogonld field, and 4) a ProcessId field.

In contrast, the following represents in JSON the possible content of a field-varying column that is of a credential validation event type:

```
{
    "TargetUserName":"pinggfwd",
    "PackageName":"Contoso_Package_V1",
    "Workstation":"SN2ISWUTLA117"
    "Status":"0x0"
}
```

In this JSON example, the field-varying column includes four other name-value pairs for four fields: 1) a TargetUserName field, 2) a PackageName field, 3) a Workstation field, and 4) a Status field.

Figure 5:
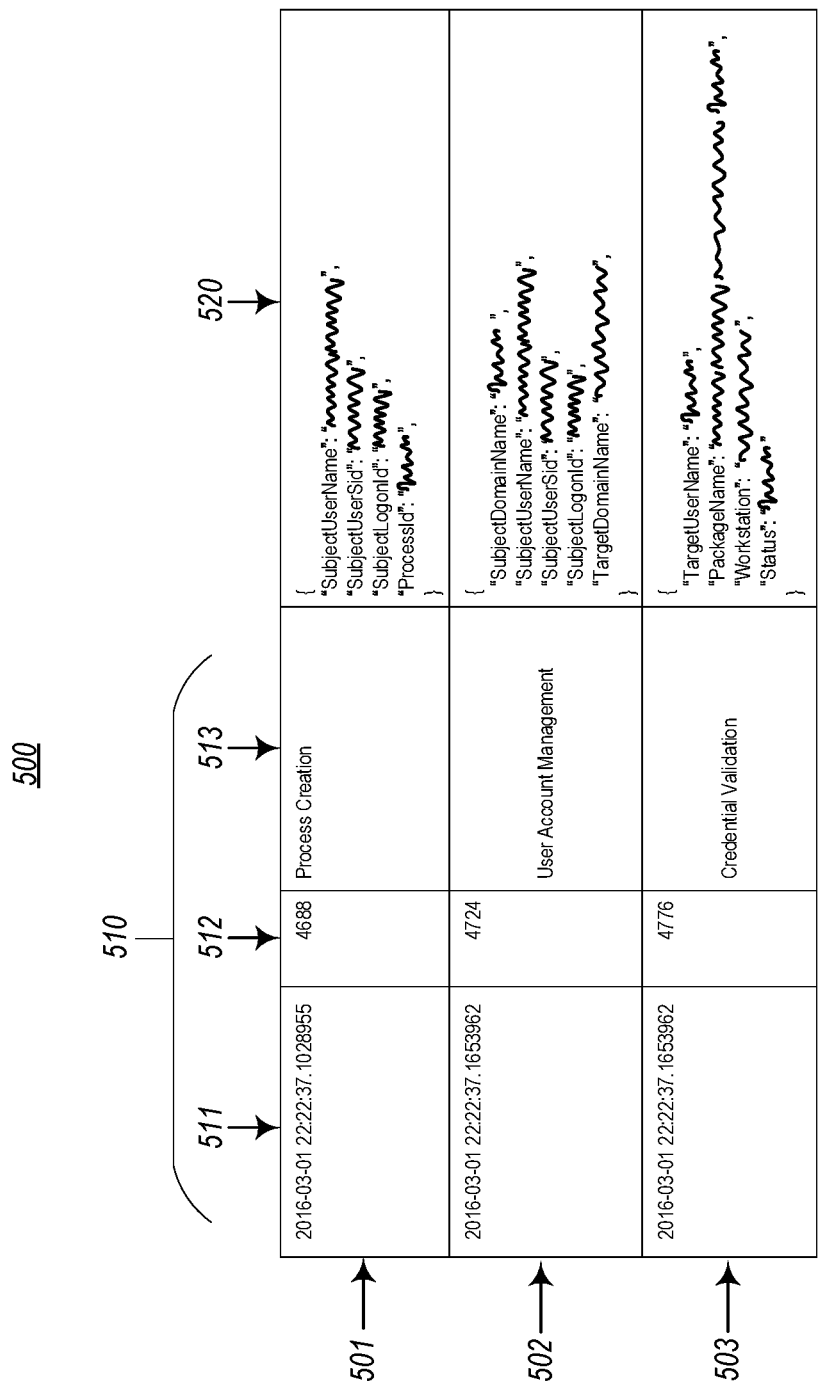
FIG. 5 is a more specific example of the table of FIG. 2, and the table of FIG. 4.

FIG. 5 illustrates a simple example table 500 that is an example of the table 400 of FIG. 4. Here, there are three rows 501, 502 and 503 corresponding to three events. There is a common column set 510 that includes three columns that include field values that are common across event types. This includes a time field 511, an event type identifier field 512, and a task field 513, that are common amongst all event types (at least for one type of local log a WINDOWS® log). There is also a field-varying column 520 that includes JSON that defines a different set of name-value pairs that differs depending on the event type. Since the common fields 512 and 513 shows that the event types of each of the three events is different (e.g., a process creation event type for row 501, a user account management event type for row 502, and a credential validation event type for row 503), the set of name value pairs in each row 501 through 503 is different. The example table 500 is not sparsely populated, and contains one field-varying column 520, which contrasts sharply with the sparse-table method of the prior art.

Figure 6:
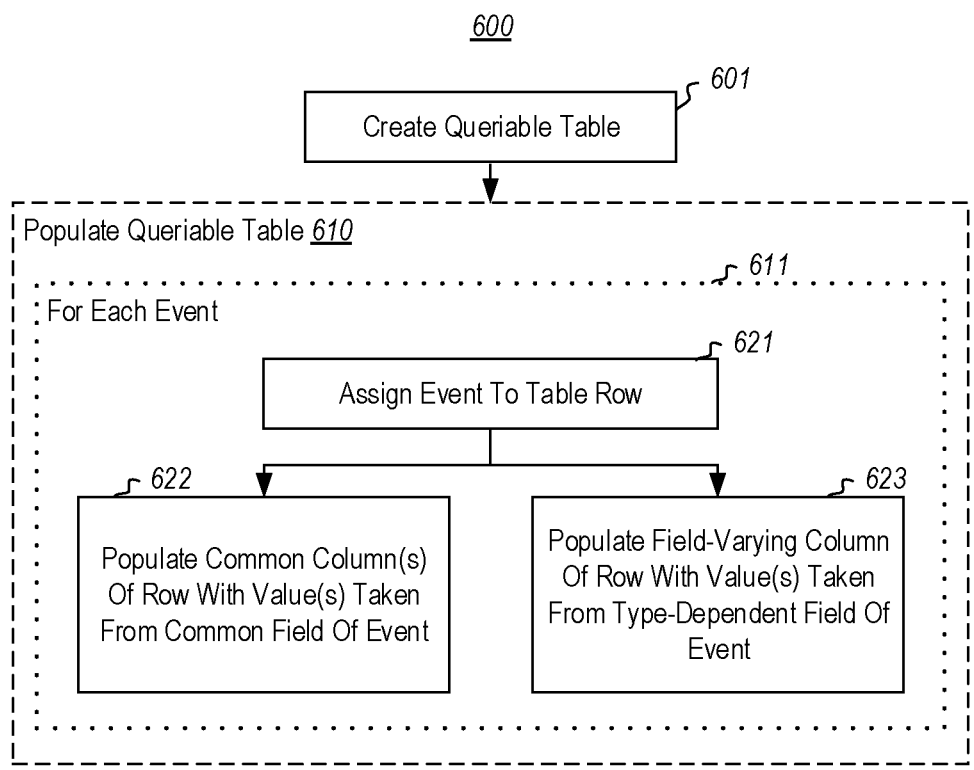
FIG. 6 illustrates a flowchart of a method or storing events of a plurality of event types in a table, such as that of FIG. 2, 4 or 5.

FIG. 6 illustrates a flowchart of a method 600 for storing events of a plurality of event types in a table. The method 600 may be performed by the table populator 230 of FIG. 2, in order to populate a table such as the table 222 of FIG. 2, the table 400 of FIG. 4, or the table 500 of FIG. 5. Accordingly, the method 600 will now be described with reference to FIGS. 2, 4 and 5. The method 600 may be performed for a single table. Alternatively, the method 600 may be performed for each of multiple tables. As an example only, in one embodiment, there is a queriable table for each type of local log from which events are gathered. For instance, there might be one queriable table for events gathered from a first local log type (e.g., a WINDOWS® log), and one queriable table for events gathered from a second local log type (e.g., a LINUX® log).

The method 600 includes creating a queriable table for receiving data from events of a plurality of event types (act 601). That queriable table may be, for instance, the queriable table 220 of FIG. 2, the table 400 of FIG. 4, or the table 500 of FIG. 5. Specifically, the queriable table 400 has 1) at least one common column 411 that corresponds to a particular field that is common across events regardless of event type, and 2) at least one field-varying column 412 that corresponds to a type-dependent field that depends on event type. The queriable table 500 has three common columns 511, 512 and 513, and one field-varying column 520.

The method 600 further includes populating the queriable table using multiple events (act 610). For instance, in the context of FIG. 2, the query populator 230 may use some or all of the events in the event sequence 210 in order to populate the table 222 of FIG. 2, an example of which is the table 400 of FIG. 4, or the table 500 of FIG. 5. That said, the method 600 may be performed separately to populate different queriable tables.

The populating may involve performing tasks for each event. Such tasks are represented within the box 611 in FIG. 6. Each event is assigned to a row of the queriable table (act 621). For instance, the queriable table 222, table 400, or table 500 may be pre-created with a certain number of rows, or rows are added as new events are detected in the event sequence 210 for populating into the queriable table.

The common column at each respective assigned row is populated with a value taken from the same common field of each respective event that corresponds to that row (act 622). For instance, referring to FIG. 5, when populating the table 500 with the first event, the common column 511 for the time field at row 501 is populated with a time taken from the first event, the common column 512 at row 501 is populated with an event type identifier taken from the first event, and the common column 513 at row 501 is populated with a task value taken from first event.

Likewise, the field-varying column at each respective assigned row is populated with one or more values taken from at least one type-dependent field that dependents on the event type (act 623). For instance, when populating the table with the first event, the name-value pairs for SubjectUser-Name, SubjectUserSid, SubjectLogonId, and ProcessId, are extracted from the first event, converted into JSON, and inserted into the UserData column of row 501.

When populating table 500 with the second event at row 502, the Time value, the EventId value, and the Task value are taken from the second event, and populated into respective fields 511, 512 and 513 in row 502 (act 622). The name-value pairs for SubjectDomainName, SubjectUser-Name, SubjectUserSid, SubjectLogonId, and TargetDo-mainName, are extracted from the second event, converted to JSON, and inserted into the UserData column 520 of row 502 (act 623).

When populating table 500 with the third event at row 503, the Time value, the EventId value, and the Task value are taken from the third event, and populated into respective fields 511, 512 and 513 in row 503 (act 622). The name-value pairs for TargetUserName, PackageName, Worksta-tion, and Status are extracted from the second event, converted to JSON, and inserted into the UserData column 520 of row 503 (act 623).

In some embodiments, the events as stored in the local logs might not have structure. In that case, the gathering system 320 may impose some structure on the events, by parsing the event to provisionally identify fields and associated values. The now structured event may then be passed to the populator 230 for population into the table 222.

Figure 7:
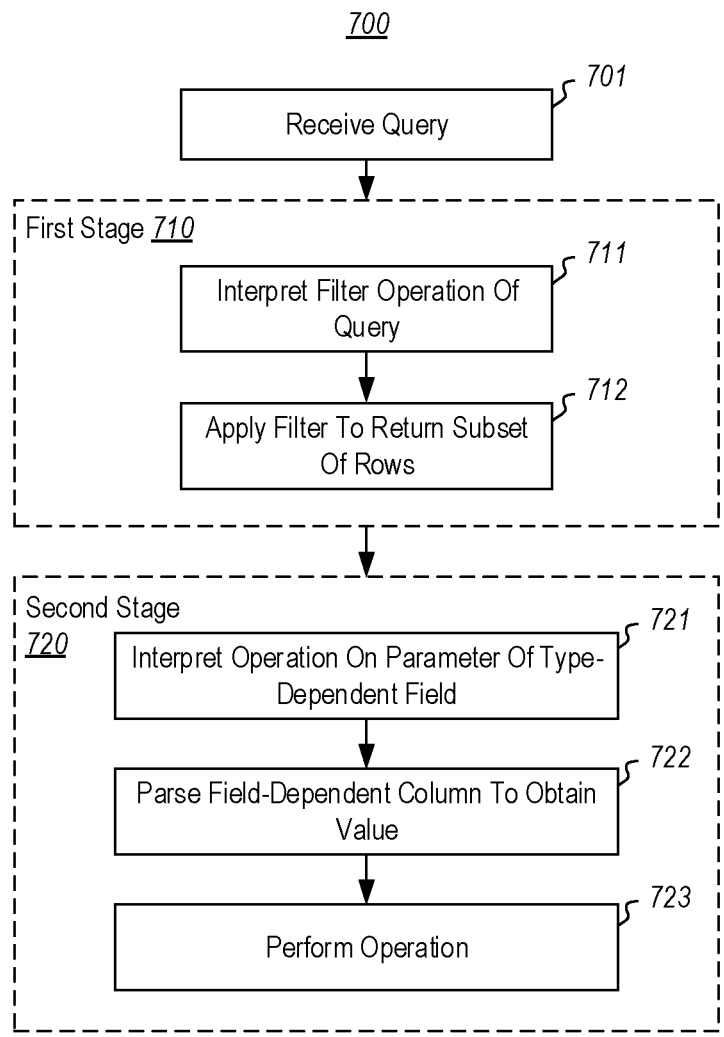
FIG. 7 illustrates a flowchart of a two-staged method for processing one or more queries to a queriable table such as that of FIG. 2, 4 or 5.

With the queriable table being populated, queries may be posed against the queriable table, even if the queriable table is ever expanding with more and more events. FIG. 7 illustrates a flowchart of a method 700 for processing one or more queries to a queriable table. The method 700 may be performed on the queriable table 222 of FIG. 2, an example of which is the table 400 of FIG. 4 and the table 500 of FIG. 5. The principles described herein are not limited to the particular method of querying the queriable table, but the method 700 is provided simply by way of example.

The method 700 is initiated upon receiving a query against the queriable table (act 701). As an example, the method 700 may be used to process the query 223 of FIG. 2. The query is then processed in two stages 710 and 720. In the first stage 710, the query is interpreted to apply a filter operation on a common column (act 711). As an example, the filter operation might be to identify all events of a particular event type. The filter operation is then performed to obtain a filtered set of rows of the queriable table (act 712). For instance, the query might be to return all or a specified subset of events of event type identifier 4688. Again, the common columns may be indexed to allow for this first stage 610 to quickly and efficiently filter down the number of events.

In the second stage 720, the filtered set of rows is processed against one or more value parameters from a type-dependent field in the field-varying column (act 721). As an example, operation may be performed on the Pro-cessId field that is within the field-varying column 520 of FIG. 5. Parsing the type-dependent field from amongst a plurality of type-dependent fields present in the field-varying column (act 722), and processing the parsed type-dependent field by performing the operation (act 723).

The first stage 710 might be performed in response to a first query, resulting in the filtered set of row being presented to the user. The user might then use information from the filtered set to issue a second query that narrows in on the field-varying column, resulting in the second stage 720 being performed. Alternatively or in addition, the querying might already have some knowledge of the available content of the field-varying column, and thus specify enough information in the query to accomplish both the first stage 710 (filtering on common columns) and the second stage 720 (parsing the field-varying column). For instance, the query might be a composite query that specifies both the first stage operation and the second stage operation. As an example the first stage query might be nested within a second stage query to provide for piping of the results from the first stage into the next. This principle may extend to piped queries with any number of stages.

The query process is slightly more complicated that it would be with a sparse table approach, but much more simple than it would be if a relational database were employed with one table per event type. There would be no need for the user to remember the table or the unique field types of the tables, and no or few union operations would be necessary. Yet, the query process is still powerful allowing for detailed querying perhaps in two stages upon all of the fields of various different types of events. Accordingly, the centralized table can be queried efficiently, and quickly, which is of great advantage when mitigating harm caused by a cyber-attack, when operational problems are being diagnosed, or any other situation where time is of the essence.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable media having stored thereon computer-executable instructions that are executable by the one or more processors to configure the computing system to create and populate a queriable table with events of a plurality of event types, and by at least configuring the computing system to:
   create a queriable table for receiving data from events of a plurality of event types, the queriable table having 1) at least one common column that corresponds to at least one common event field common across a plurality of all events to be populated into the queriable table regardless of event type, and 2) a field-varying column that corresponds to an event type-dependent field that depends on an event type of the plurality of event types not common across the plurality of all events to be populated into the queriable table;
   identify a new event is to be populated into the queriable table;
   add a new row to the queriable table for the new event, the new row including the at least one common event field within the at least one common column of the queriable table and that is common across the plurality of all events to be populated into the queriable table, as well as the event type-dependent field within the field-varying column that depends on the event type of the plurality of event types and that is not common across the plurality of all events to be populated into the queriable table;

populate the at least one common event field in the new row with at least one value taken from the new event; and populate the event type-dependent field in the new row with a plurality of name-value pairs, including populating the event type-dependent field in the new row with a separate name-value pair for each of a plurality of type dependent fields of the new event, each separate name-value pair specifying a corresponding type dependent field name and a corresponding type dependent field value taken from the new event, the plurality of name-value pairs being dependent upon the event type of the new event and being uncommon across the plurality of all events to be populated into the queriable table.

2. The computing system in accordance with claim 1, the computer-executable instructions being further executable by the one or more processors for configuring the computing system to:

receive an event stream comprising events from a plurality of other computing systems, the plurality of all events comprising at least some of the events in the event stream.

3. The computing system in accordance with claim 1, the at least one common column being an event type identifier column.

4. The computing system in accordance with claim 3 the plurality of name-value pairs populated into the event type-dependent field in the new row being different than another plurality of name-value pairs populated into another event type-dependent field in another row, depending on an event type identifier in the event type identifier column for each row.

5. The computing system in accordance with claim 1, the queriable table comprising a first queriable table and the plurality of all events being a first plurality of events, the computer-executable instructions being further executable by the one or more processors for configuring the computing system to:

create a second queriable table that also has at least one common column, and at least one field-varying column; and at least partially populate the second queriable table using a second plurality of events.

6. The computing system in accordance with claim 5, the first plurality of events being events that were stored in logs of a first local log type, and the second plurality of events being events that were stored in logs of a second local log type.

7. A computing system comprising:

one or more processors; and one or more computer-readable media having stored thereon computer-executable instructions that are executable by the one or more processors to configure the computing system to query a queriable table having 1) at least one common column that corresponds to at least one common event field common across a plurality of all events having a plurality of event types to be populated into the queriable table regardless of event type, and 2) a field-varying column that corresponds to an event type-dependent field that depends on an event type of the plurality of event types and that is not common across the plurality of all events to be populated into the queriable table, and by at least configuring the computing system to:

receive a first query against the queriable table;

interpret the first query as applying a filter operation on the at least one common column;

filter on the at least one common column to obtain a filtered set of rows of the queriable table; and subsequent to generating the filtered set of rows based on the first query, perform a second query on the filtered set of rows with a parameter selected from the event type-dependent field in the field-varying column to identify one or more events in the queriable table, wherein at least one row in the filtered set of rows comprises an event type-dependent field in the field-varying column that includes a plurality of name-value pairs, the event type-dependent field including a separate name-value pair for each of a plurality of type dependent fields of a single event that is indexed in the at least one row, each separate name-value pair specifying a corresponding type dependent field name and a corresponding type dependent field value taken from the single event.

8. The computing system in accordance with claim 7, the computer-executable instructions being further executable to cause the computing system to:

receive a second query against the queriable table; and interpret the second query, wherein processing of the filtered set of rows is performed in response to interpreting the second query.

9. The computing system in accordance with claim 8, the computer-executable instructions being further executable to cause the computing system to, prior to receiving the second query:

present at least some of the filtered set of rows to a user that submitted the first query.

10. The computing system in accordance with claim 7, the computer-executable instructions being further executable to cause the computing system to further process the filtered set of rows against a value parameter of the event type-dependent field in the field-varying column, including:

parsing the event type-dependent field from amongst a plurality of type-dependent fields present in the field-varying column; and processing the parsed event type-dependent field.

11. A method for creating and populating a queriable table with events of a plurality of event types, the method comprising:

creating a queriable table for receiving data from events of a plurality of event types, the queriable table having 1) at least one common column that corresponds to at least one common event field common across a plurality of all events to be populated into the queriable table regardless of event type, and 2) a field-varying column that corresponds to an event type-dependent field that depends on an event type of the plurality of event types not common across the plurality of all events to be populated into the queriable table;

identifying a new event is to be populated into the queriable table;

adding a new row to the queriable table for the new event, the new row including the at least one common event field within the at least one common column of the queriable table and that is common across the plurality of all events to be populated into the queriable table, as well as the event type-dependent field within the field-varying column that depends on the event type of the plurality of event types and that is not common across the plurality of all events to be populated into the queriable table;

populating the at least one common event field in the new row with at least one value taken from the new event; and populating the event type-dependent field in the new row with a plurality of name-value pairs, including populating the event type-dependent field in the new row with a separate name-value pair for each of a plurality of type dependent fields of the new event, each separate name-value pair specifying a corresponding type dependent field name and a corresponding type dependent field value taken from the new event, the plurality of name-value pairs being dependent upon the event type of the new event and being uncommon across the plurality of all events to be populated into the queriable table.

12. The method in accordance with claim 11, further comprising:

receiving an event stream comprising events from a plurality of other computing systems, the plurality of all events comprising at least some of the events in the event stream.

13. The method in accordance with claim 11, the at least one common column being an event type identifier column, the plurality of name-value pairs populated into the event type-dependent field in the new row being different than another plurality of name-value pairs populated into another event type-dependent field in another row, depending on an event type identifier in the event type identifier column for each row.

14. The method in accordance with claim 11, the queriable table comprising a first queriable table and the plurality of all events being a first plurality of events that were stored in logs of a first local log type, the method further comprising:

creating a second queriable table that also has at least one common column, and at least one field-varying column; and at least partially populating the second queriable table using a second plurality of events that were stored in logs of a second local log type.

* * * * *